(12) United States Patent
Adebimpe et al.

(10) Patent No.: US 7,694,628 B2
(45) Date of Patent: Apr. 13, 2010

(54) METHOD OF PRODUCING ENERGETICALLY-INERT PSEUDOSCENTS OF EXPLOSIVE MATERIALS, AND COMPOSITIONS THEREOF

(75) Inventors: David B. Adebimpe, Annapolis, MD (US); Marek A. Zgol, Annapolis, MD (US); R. Glenn Wright, Annapolis, MD (US)

(73) Assignee: GMA Industries, Annapolis, MD (US)

( * ) Notice: Subject to any disclaimer, the term of this patent is extended or adjusted under 35 U.S.C. 154(b) by 1019 days.

(21) Appl. No.: 11/385,472

(22) Filed: Mar. 21, 2006

(65) Prior Publication Data

US 2007/0221087 A1   Sep. 27, 2007

(51) Int. Cl.
*F42B 15/34* (2006.01)
*F42B 4/16* (2006.01)
*D03D 23/00* (2006.01)
*D03D 43/00* (2006.01)

(52) U.S. Cl. ............... 102/355; 102/293; 102/705; 149/109.6

(58) Field of Classification Search ............ 102/355, 102/293, 705; 149/109.6
See application file for complete search history.

(56) References Cited

U.S. PATENT DOCUMENTS

| | | |
|---|---|---|
| 4,987,767 A | 1/1991 | Corrigan et al. |
| 5,109,691 A | 5/1992 | Corrigan et al. |
| 5,359,936 A | 11/1994 | Simpson et al. |
| 5,413,812 A | 5/1995 | Simpson et al. |
| 5,585,575 A | 12/1996 | Corrigan et al. |
| 5,648,636 A * | 7/1997 | Simpson et al. ............ 102/355 |
| 5,958,299 A | 9/1999 | Kury et al. |

OTHER PUBLICATIONS

Mimi Hall, "Scientists recruit wasps for war on terror", http://www.usatoday.com/tech/news/2005-12-26-wasps-terrorism_x.htm, Dec. 26, 2005.

* cited by examiner

*Primary Examiner*—Jerry Lorengo
*Assistant Examiner*—James E McDonough
(74) *Attorney, Agent, or Firm*—Prass LLP (57) ABSTRACT

This invention relates to a method that can be used to scientifically fabricate pseudoscents of explosives, which, in their entirety, are comprised of non-energetic materials. It also discloses specific compositions of such pseudoscents, which can be used as energetically-inert-but-odoriferously-identical simulants for a range of explosives and are comprised of non-energetic components of the scent signature of an explosive and/or energetic scent components of the same headspace scent signature that have been rendered non-energetic. The scents achievable by the groups of formulations generated by this method encompass the different types of military and commercial explosives, and the components within the pseudoscents can be tuned to generate simulants representative of different qualities and quantities of such explosives. These explosive-scent simulants can be used to bolster existing explosive detecting dog (EDD) training programs, establish new training paradigms in canine, rodent, insect, and other creature explosive detection and training and, in some cases, increase the efficiencies of analytical instruments that rely on the phenomenon of vapor sampling to detect explosive materials.

44 Claims, 1 Drawing Sheet

METHOD OF PRODUCING ENERGETICALLY-INERT PSEUDOSCENTS OF EXPLOSIVE MATERIALS, AND COMPOSITIONS THEREOF

STATEMENT AS TO RIGHTS TO INVENTIONS MADE UNDER FEDERALLY SPONSORED RESEARCH AND DEVELOPMENT

The research carried out in the subject application was sponsored by contract nos. M67854-03-C-5006 and M67854-04-C-4000 from the United States Marine Corps Small Business Innovation Research (SBIR) program. The government may have certain rights in any patents issuing on this application.

FIELD OF INVENTION

The present invention relates to a method to produce pseudoscents of explosive materials that are themselves entirely devoid of any explosive material, and can be used to compliment or supplant the use of real explosives in the training and evaluation regimen of explosive detecting dogs and other creatures. It also relates to experimental methods for validating such pseudoscents, and defines the compositions of some pseudoscents simulants.

BACKGROUND OF INVENTION

Increased concern for terrorist activities has greatly intensified interests in the use of creatures such as explosive sniffing dogs (canines), honeybees and rats, and also sensitive analytical instruments, for the detection of explosives. As a consequence, a need for improved, easy to handle training and calibration aids has emerged. To meet this need, several efforts have been made to develop scent simulants enhancing the process of explosives detection. For example, U.S. Pat. Nos. 5,648,636, 5,413,812 and 5,359,936, to Simpson et al., relate to explosive simulators which are a combination of an explosive material with an inert material, either in a matrix or as a coating, where the explosive has a high surface ratio but small volume ratio. The simulator has particular use in the training of explosives detecting dogs, calibrating analytical instruments which are sensitive to either vapor or elemental composition, or other applications where the hazards associated with explosives is undesirable but where chemical and/or elemental equivalence is required. The explosive simulants may be fabricated by using different techniques. A first method involves the use of standard slurry coatings to produce a material with a very high binder to explosive ratio without masking the explosive vapor, and a second method involves coating inert substrates with thin layers of explosive.

Explosive simulants have also been fabricated for a detection method based on analytical principles. For example, U.S. Pat. No. 5,958,299 issued to Kury et al. relates to methods for fabricating non-energetic explosive simulants, specifically for equipment designed to remotely detect explosives. The simulants are non-explosive, non-hazardous materials that can be safely handled without any significant precaution. The simulants imitate real explosives in terms of mass density, effective atomic number, x-ray transmission properties, and physical form. These simulants are different from those needed for training creatures, as they are fabricated for a detection method based on analytical principles different from those pertaining to creature, particularly canine, detection, or for the calibration of instruments that rely on the principles of headspace vapor sampling to detect detonable materials.

There are several limitations to the types of scent simulants that can be produced from the direct use of real explosives. These limitations stem from the use of a methodology based on principles other than those pertaining to the underpinnings of scent analysis, scent detection, and of pseudoscent formulation. Explosive scent simulants are presently produced by dispersing optimized amounts of the explosive to be simulated within a dispersant, in an attempt to maximize the scent generated while using as little of the explosive as possible. The method leaves unaddressed, issues involving the particular scents generated by explosives, the scents generated by dispersed explosives, scent formulation and control and the relationship of all these to the olfactory capacity, or limitations, of explosive detection creatures.

Accordingly, there is continuing interest in the development of explosive-scent simulants, particularly of scent simulants that do not contain any of the energetic materials, or the explosive capacity, of the explosives they are designed to simulate. This is because, as an additional benefit, it would be possible to handle, transport, and store such energetically-inert pseudoscents in ways that would have been impossible as explosives, and which will present logistical relief for explosive detection programs.

SUMMARY OF THE INVENTION

The present invention relates to a method that can be used to produce energetically-inert pseudoscents of explosives that smell so similar to the explosive being simulated that both scents are indistinguishable to an explosive detecting creature. Such compositions of pseudoscents can be used as aids for the training and evaluation of creatures, such as dogs, in explosives detection.

In one aspect, the invention features a method for producing an energetically-inert pseudoscent of an explosive which includes identifying the energetic components within the headspace scent signature of the explosive, de-energizing the energetic components identified within the headspace scent signature; and combining the de-energized equivalents into a first formulation, wherein the energetically-inert pseudoscent is substantially free of the explosive.

In another aspect, the invention features a method for producing an energetically-inert pseudoscent of an explosive which includes identifying the non-energetic components within the headspace scent signature of the explosive; selecting the identified non-energetic components; and combining the selected non-energetic components of the headspace scent signature into a second formulation; wherein the energetically-inert pseudoscent is substantially free of the explosive.

In another aspect, the invention features an energetically-inert pseudoscent composition of an explosive which includes non-energetic components within the headspace scent signature of an explosive, the composition being substantially free of explosives.

In yet another aspect, the invention features an energetically-inert pseudoscent composition of an explosive which includes de-energized equivalents of the energetic components within the headspace scent signature of an explosive, the composition being substantially free of explosives.

In yet another aspect, the invention features a method for producing a training aid for the training and evaluation of creatures in explosives detection including de-energizing the energetic components of the headspace scent signature of an explosive; combining the de-energized components into a first formulation; combining non-energetic components of a headspace scent signature as a second formulation; and optionally admixing the first and second formulation into a composite formulation, wherein the training aid is substantially free of explosive.

Embodiments may also include one or more of the following. Compositions of pseudoscents include no energetic components whatsoever but whose scents nonetheless simulate the scents of explosives such as trinitrotoluene (TNT), pentaerythritol tetranitrate (PETN), cyclotrimethylenetrinitramine (RDX), nitroglycerin, black powder, triperoxide-, azide-, inorganic nitrates, and nitrocellulose-based explosives. These scents have no direct physical or chemical equivalence to the explosives that they simulate; they are solely of odoriferous equivalence. Also, as none of the pseudoscent components can be classified as an explosive material, these pseudoscents can also be stored and transported using methods and forms, which, as explosives, would be hazardous or impossible. The pseudoscents produced by this method are suitable for the training of canines, as well as other creatures, to detect detonable materials, and each pseudoscent type contains carefully selected odoriferous markers that define a particular explosive type. Using these pseudoscents with an effective explosives-detection training regime will allow explosives-detecting creatures such as dogs to achieve detection efficiencies that are far superior to those achieved by training on both real explosives and simulants fabricated using real explosives. This is because, unlike in the case of using real explosives in which the exact nature of scent components being used by dogs to identify the explosives are unknown, the principal components needed for detection have been scientifically identified, isolated from the headspace scent signature of each explosive, and have been thereafter formulated into a pseudoscent whose scent components are known and can be precisely controlled.

Other features and advantages of the invention will be apparent from the following detailed description.

DEFINITION OF TERMS

An explosive scent simulant is a substance that produces a scent that is so similar to the scent of the explosive it is supposed to simulate that both scents cannot be differentiated from one another by an explosive detecting creature. Such a scent simulant can also be referred to as the odoriferous equivalent of that explosive.

An energetically-inert explosive pseudoscent is an explosive scent simulant that does not contain any of the energetic components of the explosive being simulated.

An energetic material is a chemical substance that has the energy to cause an explosion.

A de-energized derivative of an energetic material is a derivative that has lost the intrinsic explosive characteristics of the energetic material but still retains the scent characteristics.

DETAILED DESCRIPTION OF THE INVENTION

The present invention relates to pseudoscents of explosive materials, which are essentially scent simulants of an explosive that does not contain any explosive materials themselves. These pseudoscents will be particularly useful in the evaluation and training of explosives detecting canines. The threat of terrorist activities towards US concerns at home and abroad, has made explosives detection a priority in effecting the protection of our infrastructure and citizenry. Even with all the technology available for explosives detection, canines offer the advantage of being the least costly and most reliable explosives search-and-detect tool. When fully trained, a typical canine can search a car per minute and over 400 packages in half an hour. Furthermore, unlike the point-detection ability of explosives detection instruments, canines can pick up a scent and track it to its source. Known for their acute sense of smell, canines have been used to perform various forms of scent-based detection work, including search and rescue of missing or injured persons, narcotic and drug detection by the police and federal authorities, accelerant detection in possible arson incidences, and incendiary device detection for bomb threats. In a bomb threat situation, a trained explosives detecting dog (EDD) will "key" (i.e., identify and/or detect) onto explosive-specific scents, which, to a human, are seemingly indistinguishable from other scents present in the environment. However, even with such superb discriminatory capacity, explosives-detecting dogs (EDDs) miss a small-but-significant percentage of explosives during their search process. These failures are caused by a number of factors, the most pertinent being improper foundation training, the use of wrong aids in detector-dog training programs, and the lack of proper training aids. In order to decrease these failure rates, new and technically superior explosive scent simulants are needed.

In these modern times, real explosives are still used in the production of explosive scent simulants. In a typical scent-simulant fabrication process, the energetic component of the explosive to be simulated is homogeneously dispersed within an inert matrix, in amounts that are "too small to detonate". This method of explosive-scent simulant fabrication is based on the philosophy that the scent of an explosive must emanate from the energetic materials that constitute the bulk of the explosive, and nothing else—therefore, a PETN-based explosive must smell like PETN itself and TNT-based explosive must essentially smell of TNT. From this simple premise, which translates to "what we see is what we smell," further deductions were advanced that canines must be keying onto the scent(s) of the energetic component(s) within an explosive during a search-and-detect exercise; and that a detection creature must therefore be trained on the pure scent of the material that it is required to detect, for it to successfully search-and detect that material. The present invention underpins the fact that in humans, their genre, and in a host of other creatures, what is seen is not necessarily what is smelt. In the first instance, just as different creatures see the same object with different degrees of resolution—since their vision is limited to species-dependent wavelengths—so is the sense of smell. Therefore creatures also smell the same object with different resolutions. However, and more importantly, whatever it is that any creature smells must have the prime requirement of being volatile enough to be able to exude from what the creature sees, and its concentration within the scent signature of what they see must be equal or greater than the creature's olfactory threshold for that particular scent. The olfactory threshold can be defined as the lowest olfactory stimulus intensity a creature can detect. Due to differences in conformations olfactory organs and density of olfactory cells, it is also expected that the olfactory threshold for a particular scent will differ from creature to creature.

In most instances, non-energetic components of an explosive are more volatile than the energetic components that make up the bulk of the explosive. The higher volatility of the non-energetic components means that they will be of a higher concentration within the headspace scent signature of the explosive. In fact, the differences in volatility is such that the concentration of non-energetic components within the headspace scent signature of an explosive can be over two hundred times greater than the concentration of energetic components, even though the non-energetic components normally constitute no greater than five percent of the bulk of the explosive. The highly volatile nature of non-energetic components means that they will be ever-present within the scent signature of explosives and this makes them better odoriferous markers for an explosives detection program based on olfaction, as they will be easier to detect by olfactory receptors involved in the sense of smell, which involves vapor sampling. Furthermore, engaging these non-energetic scents as training aids within the training regimen of, for example, explosives detecting canines will greatly improve their success rate in detecting explosives.

As a further example, energetic materials such as Pentaerythritol tetranitrate (PETN), Cyclotrimethylenetrinitramine/1,3,5-hexahydro-1,3,5-trinitrotriazine (RDX), octahydro-1,3,5,7-tetranitro-1,3,5,7-tetrazocine (HMX), Nitrocellulose (NC), Tetryl, trinitrotoluene (TNT), and inorganic energetic materials such as ammonium nitrate (AN) have very low vapor pressures. Due to their low vapor pressures, the scents of these and most other commonly used energetic materials, cannot significantly contribute to the headspace scent signatures of the explosive material they constitute; consequently, explosives-detecting canines (and analytical instruments) that are trained to detect just the energetic component(s) of an explosive will be consistently pushed to the limits of their sensitivity and their performance will be difficult to enhance or optimize. Moreover, when combined with other materials such as polymeric binders, plasticizers and waxes, the actual concentration (and final ratios) of these energetic materials within the headspace scent signature of an explosive material diminishes, and may change from one explosive type to another—even if the energetic component within the explosive is the same type and quantity.

As for the scent of an explosive when it is dispersed, a dispersant containing a 20% weight amount of TNT will exhibit a scent signature that differs from a block of pure TNT explosive as it will lack those odoriferous components of the scent signature necessary to formulate an effective scent simulant or training aid for, for example, an explosive detecting dog (EDD) program. One of the reasons for this that the amounts of highly volatile, non-energetic components, which normally constitute less than 5% of the bulk of an explosive, will be less than 1% within a dispersant that contains 20% of the explosive. Since these non-energetic components also have high evaporation rates, they will evaporate off the dispersant sooner than the less-volatile components, thereby leaving the wrong components for dogs to identify with as key odoriferous markers during explosive-detection training programs. Moreover, a 20% weight amount of highly dispersed TNT will degrade much faster than a block of pure TNT, due to accelerated degradation caused by high surface area provided by the dispersant. This high surface area will also accelerate degradation pathways atypical of pure TNT and lead to the production of decomposition products typically absent (or present in low concentrations) within the scent signature of a block of pure TNT explosive.

Also, using solvents to effectively disperse explosives within dispersing matrices during the formulation of an explosive-dispersed simulant could result in a significant amount of such solvent(s) trapped within the interstices of the dispersant. These matrix-trapped solvent molecules, in concert with the high surface area provided by the dispersant, can promote reactions, which are typically thermodynamically-unfavorable, with the explosive within the matrices, further leading to the formation of atypical volatile degradation products that might further taint the scent signature.

All-in-all, the combination of odors from solvent, reaction processes and decomposition products result in a headspace scent signature that substantially differs from that of a pure block of TNT explosive. This will diminish the precision through which a trainer can condition a dog, or any other creature, to identify with and thereafter detect, the real odoriferous markers of an archetypical TNT-based explosive. Predictably scent simulants made by the simple dispersion of small amounts of explosive materials within inert dispersive matrices have produced a low level of detection by EDD's when used within training and evaluation programs.

It is evident that that the negligible contribution of energetic materials towards the headspace scent signature of the explosive they constitute justifies a need for modification of the philosophy(ies) involved in selecting components for the fabrication of explosive scent simulants and on how canines and analytical instrumentation should be "trained" to detect explosives. Scent simulants and pseudoscents that are fabricated for research and developmental work in explosives detection will be more effective if their formulations embrace both the de-facto constituents of the headspace scent of the explosive material and, in the case of EDD training, addresses the olfactory competence of the explosives detecting canine, and not of the energetic components within an explosive. Such considerations will result in the formulation of simulants that can actually be used to develop, sharpen, and/or evaluate the abilities of EDDs and increase the detection rate of analytical instruments.

The present invention therefore relates to a method suitable for fabricating pseudoscents of explosive materials which, albeit precluding any explosive material, contain the necessary odoriferous markers that characterizes a particular explosive. This method involves the process of reconstituting the experimentally determined headspace scent signature of an explosive into a formulation that retains all non-energetic components within such a signature and substitutes the energetic components within the scent signature with "de-energized but odoriferously equivalent" components.

Unlike the principles currently used in the manufacture of non-detonable explosive scent simulants, the foundation of this invention hinges on the supposition that the physico-chemical composition of an explosive material is of minor significance in the fabrication of an explosive simulant for the training and evaluation of explosive-detecting creature; what is more important is its scent—which can be determined by the analytical identification of the headspace scent signature of these explosive materials—as this is essentially what the diversity of explosive detecting creatures such as dogs, rodents and bees detect.

The present invention also relates to compositions of energetically-inert pseudoscents of explosives that contain no energetic components whatsoever but are identical to the scents of materials that are designated as explosives by the US Bureau of Alcohol Tobacco and Firearms. Such materials include TNT, PETN, RDX, nitroglycerin, black powder, triperoxide-, azide-, inorganic nitrates, and nitrocellulose-based explosives. These pseudoscents have no direct physical or chemical equivalence to the explosives that they simulate; they are solely of odoriferous equivalence. Also, since they are non-energetic, none of the pseudoscent formulations produced by the present method can be classified as an explosive material and the pseudoscents can be stored and transported using methods and forms, which, as explosives, would be hazardous or impossible. The pseudoscents produced by this method are also suitable for the training of EDDs and, when applicable, the calibration of analytical instrumentation that relies on the principle of vapor sampling to detect detonable materials. Using these compositions with an appropriate training regime will allow explosive detecting dogs to achieve efficiencies that are far superior to analytical instruments. By adjusting the types and ratios of components within the pseudoscent, it is also possible to further tune the pseudoscent to duplicate the scent of varying amounts of the explosive it simulates. The compositions may also be used to train other creatures, for example, bees, rodents and wasps.

Figure 1:
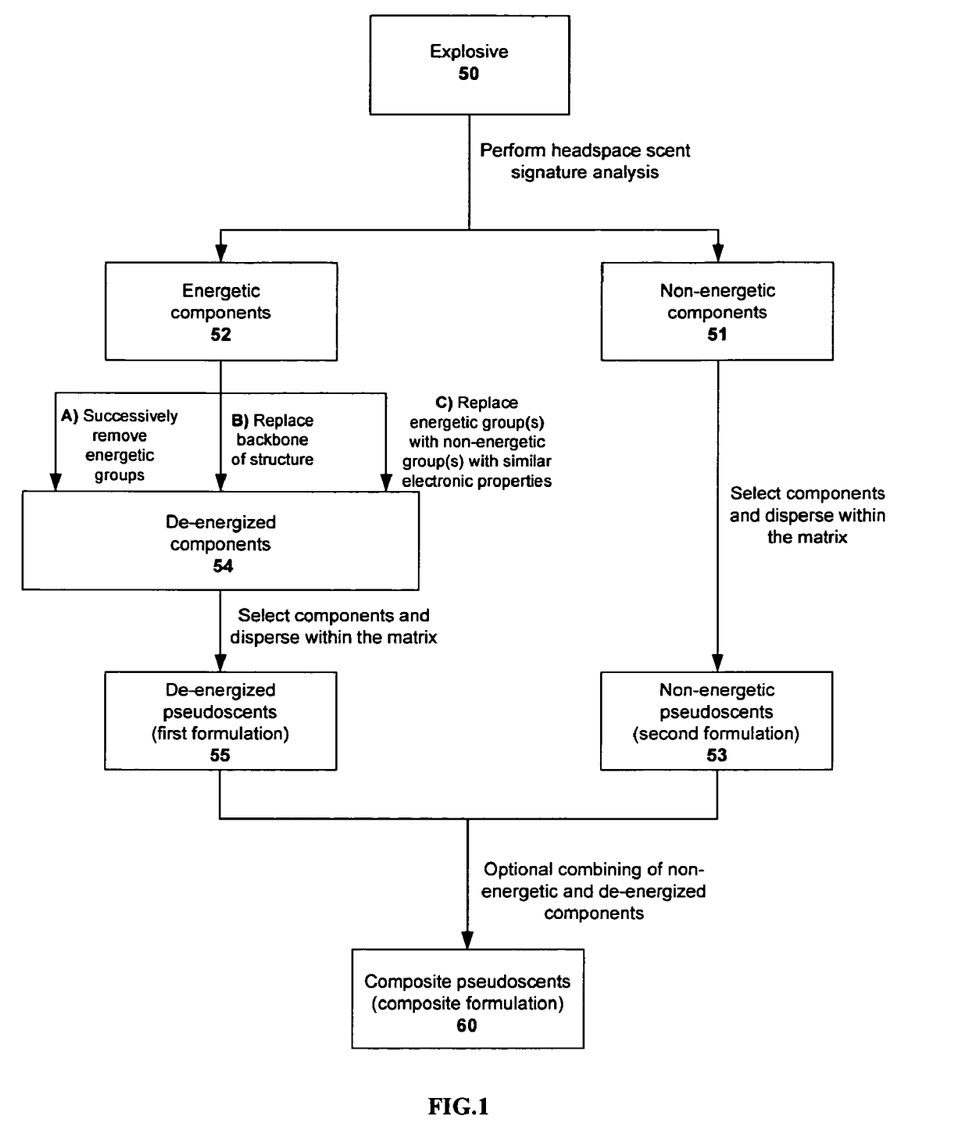
FIG. 1 is a scheme of a method advanced for producing energetically-inert pseudoscents for an explosive material.

Method of Making:

The invention can be used to make formulates of energetically-inert pseudoscents of explosives, using the method schematically illustrated in FIG. 1. The method process starts with the identification of the components within the headspace scent signature. Table 1 shows some high explosives types and primary energetic components within the explosive. As shown in Table 1, most explosives are formed by combining two or more energetic components. However, it is possible to utilize the non-energetic and/or de-energized scent of one of such energetic components in the fabrication of a pseudoscent for an explosive. For example, RDX is an energetic compound that is common within many kinds of explosives. Since it is scientifically possible to indirectly train an explosive detecting creature to detect a multitude of explosives by simply training the creature to detect a single component (energetic or non-energetic) that is common to all the explosives to be detected, an animal trained on detecting an RDX pseudoscent will be capable of detecting all explosive types that contain RDX as an energetic component. Table 2 shows the interrelationships between a simulated explosive, its energetically-inert pseudoscent formulation and the scope of detection of the pseudoscent, if used as an explosives-detection training aid. As shown in Table 2, such an explosive detection capacity will be far ranging as an animal trained on an RDX pseudoscent will be able to detect a multitude of explosives such as Composition C-2, Composition C-4, Composition A-3, Cyclotol, Detonation Cord, Composition B, and Semtex.

TABLE 1

| Explosive Type | Names of Energetic Components |
| --- | --- |
| Composition C-2 | RDX + TNT + NC |
| Cyclotol | RDX + TNT |
| Pentolite | TNT + PETN |
| Dynamite | NG + EGDN; TNT |
| Composition B | TNT + RDX + Wax |
| Composition A-3 | RDX + Wax |
| Detonation Cord | PETN or RDX |
| Smokeless Powder | NC + NG |
| Water Gel | AN + TNT; NG |
| Semtex | RDX + PETN + binder |
| Composition C-4 | RDX + PIB |
| Time Blast Fuse | Black Powder |
| Emulsion | AN + Aluminum |
| ANFO | AN + mineral oil |

NG: Nitroglycerin;
EGDN: Ethylene Glycol Dinitrate

Using the FIG. 1 to further explain the art, explosive 50 is subjected to a gas separation and identification technique such as gas chromatography (GC), to identify all components in its headspace scent. Non-energetic and energetic components are essentially organic compounds, which are substances with defined chemical compositions. The unique properties that each composition has, for example, their volatility polarity, or the presence of certain functional groups, sets the basis for their separation and identification using any of the methods available for the separation and characterization of gases. After the separation and characterization of the gaseous components derived from headspace scent analysis, identified components will then be categorized into two groups: those that are non-energetic components 51 and those that are energetic components 52.

Due to their non-energetic nature, the components constituting 51 are not classified as explosives; therefore, they can be directly used, singly or in combinations, in the formulation of energetically-inert single- or multicomponent pseudoscents 53. Their use within a formulation is achieved by simply dispersing weight amounts of one, some, or all of the component(s) into an inert support matrix, and in concentrations that are low but still above the olfactory thresholds accorded to the creature for which the pseudoscent is intended. Since this method of formulation is straightforward and direct, it is referred to as a distinct formulation. It is not necessary that all the scientifically determined non-energetic components of the headspace scent signature be used within a formulation. In fact, different formulations can be made by using different ratios any, some, or all, of 51.

Due to their energetic nature and tendency to be officially classified as explosives, the energetic components 52 have to be converted to their de-energized, smell-alike derivatives 54 before being converted into a pseudoscent formulation. These energetic components are, in fact, organic compounds with enough energy harnessed within their molecular structure to cause an explosion. In most cases, the energy is present within functional groups grafted within or along a molecular framework that can be referred to as the parent structure or structural backbone. A unit of such an energetic organic compound is a molecule whose fundamental atoms are held together through covalent bonds. Covalent bonding is a type of bonding prevalent within fundamental atoms such as carbon, hydrogen, oxygen, nitrogen and phosphorous, in which electrons need to be shared in order to form a bond between two or more of such atoms. Depending of the nature of electron sharing, such a bond can be considered saturated or unsaturated. Organic compounds can be further divided into aromatic, aliphatic and closed ring (cyclic) compounds. An aromatic organic compound is any mono- or polycyclic compound that is planar in geometry, and which also has $4n+2$ Pi electrons within its cyclic system, where n=any integer beginning with the integer zero. Non-limiting examples of energetic materials with monocyclic aromatic structural backbones are TNT, picric acid and diazodinitrophenol. Examples of those with polyaromatic structural backbones are nitronaphthalene and trinitrofluorenone. An aliphatic organic compound is a compound of a straight-chained or branched geometry whose fundamental atoms are connected through saturated or unsaturated covalent bonds. Non-limiting examples of energetic materials with aliphatic structural backbones are nitromethane, nitroglycerin, dinitropropylacrylate, and ethylene glycol dinitrate. A closed ring organic compound is an organic compound that has a closed-ring structure but is not aromatic in character, which means that it does not have the requirement of $4(n)+2$ Pi electrons, or the requirement of a planar geometry. The compound may consist of one or many rings that may be fused or connected through bonds. The bonds within a cyclic organic compound may also be saturated or unsaturated. Non-limiting examples of energetic materials with closed ring structural backbones are nitrocyclopropane, triacetone triperoxide and cyclotetramethylene tetranitramine (HMX). In some instances, metal atoms are incorporated into the structure of organic compounds, to form what are known as organomettalic materials. Non-limiting examples of energetic organometallic materials include copper acetylide, lead styphnate and sodium azide.

The process of de-energizing an energetic component of the headspace scent signature while retaining odor characteristics of the component can be achieved, at a molecular level, through three main mechanisms. The first is simply by successively removing the energetic functional groups within the structure of the molecule until the molecule becomes non-explosive in character. This type of removal entails the replacement of such an energetic group with a hydrogen atom. A second method is through the systematic replacement of some to all of the energetic functional groups within the molecular structure of the energetic material with non-energetic functional groups that share similar electron withdrawing or donating properties with that particular energetic group, until the molecule becomes non-explosive in character. The nitro group, is the most common energy imparting functional group within the molecular structure of energetic materials.

withdrawing, aromatic-ring deactivating electronic properties. However, they do not have the energetic characteristic of the nitro group.

Thus, using TNT as a more specific example, an energetic compound that has three energetic nitro groups within its molecular structure, the complete removal of one nitro group and the replacement of a second one with a chlorine atom (chlorine belongs to the halogen family of functional groups and is electronegative in character) results in a de-energized derivative, 2-chloro,4-nitro toluene, that is non-explosive in character but still retains the odor characteristics of TNT. Even the complete removal of two nitro groups from the molecular structure of TNT, and the substitution of the third nitro group with the electronically similar (i.e., electron withdrawing) aldehyde group results in a de-energized derivative (benzaldehyde) that still has the odor characteristics of TNT.

This method becomes more significant when one encounters a headspace scent signature comprised solely of energetic components, because a de-energized derivative will then be necessary for any formulation to be made. Dynamite presents such a headspace scent signature. Headspace analysis of

TABLE 2

| Specific explosive component being simulated | Possible pseudoscents (includes both non-energetic and de-energized) | Examples of specific pseudoscent formulations | Scope of explosive detection using specific pseudoscent formulation as a training aid |
|---|---|---|---|
| Cyclotrimethylene trinitramine (RDX) | 2-ethyl-1-hexanol; cyclohexanone, carene, water, 2,3-dimethyldinitrobutane | 4.60 g 2-ethyl-1-hexanol + 0.41 g cyclohexanone + 10 g diatomaceous earth | Composition C-4, cyclotol, Composition B, Composition A-3, Detonation cord, Semtex and all other explosives containing RDX |
| 2,4,6, Trinitrotoluene (TNT) | Acetonitrile, 4-methoxybenzaldehyde, acetonitrile, dinitrotoluene, 2-chloro-4-nitrotoluene and water | 2.29 g 2-chloro-4-nitrotoluene + 10 g diatomaceous earth | Composition C-2, Cyclotol, Pentonite, Composition B, Water Gel, single-based Smokeless Powder and all other explosives containing TNT |
| Inorganic nitrate-based explosives | 1,3-dichloropropene, ethyl formate, 2-butanone | 0.30 g ethyl formate + 10 g cellulose | Nitrate Salts, Water Gel, Emulsion, Nitrocellulose, Black Powder and all other nitrate-based explosives |
| Trinitroglycerine (NG) | glycerin mononitrate, glycerol triacetate, tributyrin | 5.40 g glycerol triacetate + 10 g diatomaceous earth | Dynamite, Water Gel, double-based Smokeless Powder and all other explosives containing NG |
| Nitrocellulose | Limonene, toluene, acetone, ethyl acetate, | 2.20 g Toluene + 0.65 g ethyl acetate + 20 g cellulose | Smokeless powder and all other explosives containing nitrocellulose |

The inherent energy contained within the nitro group is reflected in the fact that when there are three or more of these groups on a benzene ring, as in the case of TNT, the molecule becomes explosive in character. It is advanced that any of the nitro groups within the molecular structure of any energetic compound that constitutes the headspace signature can be replaced with non-energetic groups with similar electron withdrawing properties, to form a compound that has lost the intrinsic explosive power of the parent compound but retains the odor characteristics. Groups with electron withdrawing properties that can be used as replacement groups for the nitro group are the cyano, acetyl, halogen, or aldehyde functional groups, and their combinations. The relationship between these groups and the nitro group is that they all have electron dynamite shows that the headspace scent signature of dynamite consists solely of ethylene glycol dinitrate and nitroglycerin, both of which are very energetic materials. Using the present method, a variety of de-energized derivatives can be made from these energetic components by simply replacing the energetic functional groups within their molecular structure with non-energetic functional groups that have similar electron donating or withdrawing affinities. Examples of de-energized pseudoscents that can be derived from ethylene glycol dinitrate are ethylene glycol carboxaldehyde (replacement of the all the nitro groups within the molecular structure with aldehyde groups), ethylene glycol diacetate (replacement of all the nitro groups within the molecular structure with the acetate groups), while those for nitroglycerin are glycerin acetate (replacement of all the nitro groups within the molecular structure with the acetate groups) and glycerin carboxaldehyde (replacement of the all the nitro groups within the molecular structure with aldehyde groups). These four de-energized derivatives can be used singly or in all combinations and ratios, within a pseudoscent formulation for the dynamite explosive.

A third method of de-energizing an energetic component of the headspace scent signature while retaining odor characteristics of such a component is through the substitution of the structural framework of such energetic component with a higher homologue, or homologues, which harness electronic properties similar to the parent molecule. Through such substitution of a smaller structural framework with a larger or a differently-configured one, the explosive potential of the energetic components can be diluted to the extent that it looses its explosive character, since the ratio of the energetic functional groups to the whole molecule, or its ability to coordinate into an explosive entity, decreases. This method may be utilized with or without additional removals of the energetic functional group. Thus for the low flash point, energetic material nitromethane (boiling point 101° C.), which has an one-carbon aliphatic structural framework, a higher homologue nitroparaffin such as nitrohexane (boiling point 180° C.), which has a six-carbon aliphatic structural framework, can be used as a pseudoscent, with no change in odor. Similarly, the explosive power of energetic nitroarenes can be diluted though the substitution of the parent aromatic ring that constitutes the framework, with other single or fused ring systems, or by a conjugated aliphatic system, or their combinations, while removing as many energetic functional groups as necessary to make the compound non-energetic in character. For example, TNT can be de-energized by replacing the cyclic-and-aromatic benzene structural backbone with the linear-and-conjugated hexatriene moiety, with no change in the scent of the parent TNT explosive.

As in the formulation consisting of non-energetic components, all or any of the de-energized equivalents of energetic materials within the scent signature depicted by 54 can be dispersed in low concentrations within a matrix, to form de-energized pseudoscent 55. Since the formulation produced by this method contains derivatives of the energetic components of the headspace scent signature and not the actual energetic components themselves, it is considered indirect, and therefore referred to as a distinct type of formulation.

Optionally, a composite pseudoscent formulation comprising of both non-energetic and de-energized components of the headspace vapor, and as embodied in 60, can be formed through the combination of the non-dispersed components 51 and 54 or the combination of the matrix-dispersed components 53 and 55. Composite formulations such as 60 are also distinct formulations and can be useful in introducing components that will impart additional characteristics to a pseudoscent, such as to ascribe a specific weight range or a specific brand to the explosive to be detected.

Thus, in one embodiment, the energetically-inert pseudoscent can include non-energetic components identified within the headspace scent signature of the explosive, as a distinct formulation. Suitable examples of non-energetic components of the analyzed headspace scent signature of RDX-based explosives, that are suitable for formulation into a pseudoscent, include cyclohexanone, ethyl acetate, 2,3-dimethyl-2,3-dinitrobutane (DMDNB), 2-ethyl-hexan-1-ol, carene, 1-methylbutanoate, and mixtures thereof. For PETN based explosives, the non-energetic components of the headspace scent suitable for formulation into a pseudoscent can include xylene, styrene, 2-ethyl-1-hexanol, and decane, 2,3-dimethyldinitrobutane and mixtures thereof. For nitrocellulose-based explosives, the non-energetic components of the headspace scent suitable for formulation into a pseudoscent can include limonene, toluene, acetone, ethyl acetate, and mixtures thereof.

In another embodiment, the energetically-inert pseudoscent can include de-energized odoriferously identical equivalents 54 of the explosive, as a distinct formulation. These equivalents 54 are essentially analogues of explosive 50 that have undergone structural modification at a molecular level through either (A) a successive removal of their energetic functional groups until the molecule is rendered non-explosive in character (B) supplanting the structural backbone of the energetic molecule with a homologue that has a higher molecular weight, in an attempt to dilute or nullify the explosive effects of the energetic functional groups, and/or by (C) replacing the energetic functional group(s) within the molecular structure of an energetic molecule with a non-energetic functional group(s) that has similar electron donating or withdrawing properties. It is disclosed that these techniques will essentially render the molecule non-explosive while retaining the odor characteristics of the parent molecule.

In another embodiment the energetically-inert pseudoscent can include combinations of both energized and de-energized components of the headspace scent signature of an explosive, as a distinct composite formulation.

The formation of the pseudoscent is itself achieved by simply dispersing, at low concentration, amounts of the non-energetic and/or de-energized component(s) of the scent signature of an explosive material, as deduced from headspace analysis of the explosive material, within an inert matrix. As illustrated in Table 2, it is not necessary that all the scientifically determined non-energetic or de-energized components of the headspace scent signature be used within a first, second or composite formulation. Preferably any of the components within a headspace scent signature that has a concentration that falls within the minimum and maximum olfactory thresholds of the explosive detecting creature can be used within the formulation. Those components with lower vapor pressures can be particularly useful in the formulation of pseudoscents that will aid in the detection of equivalents of large amounts of explosives. This is because, in large amounts of explosives, the emanation of components of higher vapor pressures is so rapid that they can completely saturate a room, thereby eliminating the availability of an odor concentration gradient and resulting in the inability of the canine to trace the odor to its source. Being exposed to an area saturated with the odor for prolonged periods may also result in (a reversible) desensitization towards such odor components during a search process. So, the low vapor pressure components within the explosive scent signature will be more appropriate to be used as a training aid in this instance. Conversely, components within the headspace signature with higher vapor pressure can be particularly used in the formulation of pseudoscents that will aid in the detection of small amounts of explosives. This is due to the fact that, when small amounts of explosives are used, the headspace scent signature is dominated by the components with high vapor pressure, and these will be suitable as target scents within a training program.

The matrix used for the pseudoscent formulation may be solid, liquid or gaseous\. An example of a gaseous matrix is an aerosol. Another example is a non-reactive porous support that allows for a controlled or slow release of the components within the pseudoscents. Depending on the characteristics of the explosive scent simulant, crosslinked synthetic polymer (e.g. silica, cellulose), gels, emulsions, hydrogels, fillers (diatomaceous earth, clay, grain husks, saw-dust, porous beads, grain husks, natural fibers), bio-organic polymers, for example, may be used a dispersant matrices. The microstructure of the matrices may be such that it is amorphous or defined. Examples of matrix morphologies include spray dried power, a sphere (e.g. balls, pebbles, microspheres or a pellet). The matrix can also include other polymers, buffers, salts, or fillers. The pseudoscent formulants may also be adsorbed onto an inert matrix that has intestacies or pores with diameters that are greater than the longitudinal cross-section of the smallest odoriferous substance within the formulation. Such a matrix enables adsorption of the explosive scent simulant within the pores rather than the surface, and their slow release from the confines of the interstices, rather than their evaporation off the absorbent, thus decreasing accelerated decomposition due to surface-area catalysis.

The pseudoscent formulation can include a binder. Such a binder can include a polymer or a compound that has a molecular weight of $\geq 320$ atomic mass units. The preferable solvent to aid in the binding can be selected through using the following hierarchy: the lowest boiling liquid within the formulation as derived from the constituents of the headspace, water, or an organic solvent with a boiling point $\leq 75°$ C. at normal atmospheric pressure. The pseudoscent components, solvent, and the polymer are blended together and the solvent is thereafter evaporated under vacuum.

Such methods can be applied towards the formulation of pseudoscents for a variety of energetic materials such as nitromethane; 5-nitro triazol-3-one (NTO); trinitrotoluene (TNT); trinitro triamino benzene (TATB); 3,5-dinitro-2,6-bis-picrylamino pyridine (PYX); methyl nitrate; nitroglycerine (NG); ethylene glycol dinitrate (EGDN); diethylene glycol dinitrate (DEGDN); 2,2-bis[(nitroxy)methyl]-1,3-propanediol dinitrate (or pentaeritol tetranitrate) (PETN); nitrocellulose; trimethylol ethyl trinitrate (TMETN); tetryl; hexahydro-1,3,5-trinitro-1,3,5-triazine (RDX); methylamine nitrate; octahydro-1,3,5,7-tetranitro-1,3,5,7-tetrazocine (HMX); nitroguanidine; ammonium nitrate; ammonium perchlorate; urea nitrate; ammonium picrate; lead azide; lead styphnate; mercury fulminate and other fulminates. Suitable explosives can be Time Blasting Fuse, Detonating Cord, Trinitrotoluene (TNT), Dynamite, Composition B, tagged and untagged Composition C4, Ammonium Nitrate, Water Gel Explosive, Emulsion Blasting Agent, Smokeless Powder and Semtex.

Compositions

Pseudoscent compositions can include a plurality of non-energetic components of the headspace scent signature of explosives, and/or "de-energized but odoriferously identical" equivalents of the energetic components of the headspace scent signature of explosives. The composition is free of explosives.

Method of Evaluating Candidate Pseudoscents

A method of evaluating the efficacy of formulated pseudoscents, also referred to as a scent validation process, is advanced which comprises exposing a candidate pseudoscent to a creature, that has already been trained in explosive detection using real explosives as a training aid, such as an explosives-detecting dog. The response of the creature will determine if it can discriminate the scent of the pseudo from the scent of a real explosive, and this in turn will determine if the candidate pseudoscent is suitable as an explosive training aid for such a creature. An ability to discriminate between both scents will mean that the pseudoscent has a scent that is different from the explosive, which will deem it unsuitable for use as an explosive training an/or evaluation aid. If the response given is not different from that which the creature gives in response to the presence of a real explosive material, then the pseudoscent can be deemed suitable for use as a training aid. This method of evaluation is used in all examples 3 to 10, where dogs were used to evaluate the suitability of non-energetic components and de-energized derivatives of the headspace scent signature of explosives as simulating the scent of actual explosives.

Method for Producing a Training Aid for Training and Evaluation of Creatures in Explosives Detection A method for producing a training aid for training is broadly contemplated including, de-energizing the energetic components of the headspace scent signature of an explosive; combining the de-energized components into a first formulation; combining non-energetic components of a headspace scent signature as a second formulation; and optionally admixing the first and second formulation into a composite formulation, wherein the training aid is substantially free of explosive.

A method for producing an energetically-inert pseudoscent for explosives is broadly contemplated including a) identifying components comprising a headspace scent signature of an explosive; b) separating such components into energetic and non-energetic components; c) admixing non-energetic components of the headspace scent signature; d) de-energizing the energetic components of the headspace scent signature, and; e) combining the de-energized odoriferous equivalents of the energetic components of the headspace scent signature, or (f) optionally admixing them with the non-explosive components into a formulation, wherein the explosive scent simulant is free of explosives.

The invention disclosed herein is exemplified by the following preparations and examples, which should not be construed to limit the scope of the disclosure. Alternative preparations and analogous structures may be apparent to those skilled in the art.

EXAMPLE 1

Method of Identifying the Potential Components of a Pseudoscent, and Subsequent Pseudoscent Formulation The first stage of identifying the potential candidates for an explosive pseudoscent is to subject the explosive to an analytical method that identifies the components of the headspace scent signature of the explosive. A typical procedure of achieving this through the use of gas chromatography (GC), where the explosive of interest is placed in a flask fitted with a serum cap and allow time for its scent to equilibrate with the air inside the flask. A sample of the scent is then removed from the flask by drawing the air within the flask, into a column that contains an absorbent, using a syringe. After concentrating the scent onto the column, this scent is then desorbed from the adsorbent by heating the column. The desorbed scent travels into the GC column where its components are separated and each of the separated components of the scent are identified. This identification process is based on the different retention times of the scent components due to their polarity or mass, and is typically an automated search against a compiled database of compounds with analyzed retention times. Once the components are known, they are categorized into energetic and non-energetic. The non-energetic components can be directly used to formulate a pseudoscent, after the scent validation process. The energetic components of the headspace vapor will need to be de-energized and then the de-energized derivatives are subjected to a scent validation process before being used within a pseudoscent formulation. In some instances, the headspace scent signature, when determined by GC, shows the presence of only energetic components within the headspace, as in the case of the dynamite explosive. In this case, de-energizing the energetic components has to take place in order to derive any pseudoscent components for scent validation and pseudoscent formation. It is not necessary that all the scientifically determined non-energetic and de-energized components be used within a formulation. Typically, those component scents with vapor pressures that are sufficiently high enough to allow their presence at headspace concentrations that are above the olfactory threshold limits of a dog, or any other creature used for detection, can be used. Pseudoscents can be formulated to produce a scent profile of components in the same ratio as they are within the headspace of the explosive. Such ratios can be determined using GC methods. Pseudoscent formulation is achieved by simply dispersing the chosen non-energetic and de-energized components within an inert matrix, separately, or as a composite formulation, and in concentrations that will not allow the odor of the pseudoscent to be non effective or overwhelming during its use.

EXAMPLE 2

Method of Validating (Evaluating) a Pseudoscent, after its Formulation

For testing the suitability of non-energetic or de-energized components as a potentially useful pseudoscent, a canine search-and-detect methodology has been developed that embraces the best practices in scent detection. The setup comprised of a 7×9 (63-position), or 6×6 (36-position) grid of cardboard boxes, of 1 ft$^3$ in volume and spaced at least 4 ft apart, each of which has a 5 in diameter opening cut out of the topside to allow easy sniffing of the box by canines. Non-energetic components, as determined from headspace analysis of the explosive, were dispersed within inert matrices, put in jars and then randomly placed into each box, through the opening. So were the de-energized equivalents of some energetic components identified within the headspace. Also randomly placed within the test grid were real explosives such as ammonium nitrate, smokeless powder and C4 explosives. These are to be used to benchmark the ability of the dogs in detecting real explosives under the same conditions as the candidate scents. Distracters such as food and toys were also planted in some boxes within the grid to help ascertain the propensity of the dogs in disregarding these objects. Each test session was configured in a way that within each test session, there were more non-targets (empty boxes) than targets (occupied boxes), at least an empty box between two targets, and no more than eight candidate pseudoscents were placed within a test grid per trial session. After the samples are placed and their placement noted, a period of at least 10 minutes was allowed for the vapors of the sample to diffuse in to the box. The maximum and minimum concentration of headspace vapor that can be achieved within a box are controlled through the formulation process witch takes into consideration the vapor pressure and mass ratio of the formulation component (s), prevailing temperatures and the scent generation rate. The longevity of scent can also be determined if the evaporation rate(s) of the formulation component(s) is known. After the standing period dog/handler teams were successively allowed into the grid to commence a search for explosives hidden within the grid. At least four dog/handler teams were used during each test. All dogs used in the test process were certified, experienced explosive detecting dogs and none of the dog/handler teams knew in which boxes the candidate scents, real explosives or distracters were placed. As a team enters the grid, the handler systematically guides the canines around the grid while the canine sniffs around the perimeter and through the opening on the top side of each box, seeking for explosives that it has been trained to find. This process validates a candidate scent as being an explosive scent simulant. A candidate scent is positively validated as a potential explosive-scent simulant when the same EDD assuredly and consistently sits next to the box within which it is contained, as this means that the dog supposes that the scent emanating from the box is that of an explosive. Such assuredness, if consistently displayed by experienced EDDs mean that the material within the box being validated has a scent that is so similar to that of an explosive that it cannot be differentiated from a real explosive by an EDD. When a candidate non-energetic, de-energized or composite pseudoscent is positively validated, it can then be used within an explosives detection program as a general training aid to train the EDD instead of the explosive the pseudoscent represents. It can also be used as a specialty training aid to hone EDDs onto more precise components of an odor during explosives detection. To date, it is not known what components of an explosive scent EDDs use in its detection process.

After the end of a test run in which all dog/handler teams had each undergone a complete run of the grid, the dog/handler pairing is shuffled, and the whole process was repeated a second time. This, if achievable, helps to check for consistency of data and false dog alerts and highlight those inferences that might be due to dog/handler familiarity-or-unfamiliarity and further help in the development of novel EDD training programs. After each test session using different dogs and dog/handler combinations, both the simulants and the sniffing boxes confining them were removed from the test site perimeter. The vacated spots are then replaced by new boxes, which are to be left unused for at least a 24-hour period. This ensures that the used grid-positions are aired for periods long enough to allow for scent-dissipation if grid contamination had occurred and also that the position of scents were changed after each trial period.

EXAMPLE 3

Method of Making an Energetically-Inert Pseudoscent for Dynamite Explosive #1

Referring to FIG. 1, using GC for headspace characterization, the headspace scent signature of dynamite explosive was found to contain ethylene glycol dinitrate and trinitroglycerine as the primary components. Since both components were energetic materials as defined by 52, they needed to be de-energized before being used within a pseudoscent formulation. Thus, with the intention of forming a single-component pseudoscent for dynamite, the nitro groups within the molecular structure of trinitroglycerine were replaced with the acetate functional group, forming glycerol triacetate. The acetate group has similar electron withdrawing properties as the nitro group, and is therefore deemed odoriferously equivalent. A pseudoscent of dynamite of the type represented by 55 was then formed by dispersing 5.40 g (100%, active ingredient), glycerol triacetate in 10 g of diatomaceous earth to produce a training aid with a headspace scent signature of 3.3 ppm glycerol triacetate within the 1 ft$^3$ box. This pseudoscent was then subjected to validation using scent validity tests previously described, in order to ascertain its usability as an explosive training aid. Using a search and detect technique, five out of five canines used in this study successfully detected this scent by showing behavioral cues normally associated with finding an explosive material.

After the scent validation process, the simulant was subjected to canine explosive detection tests, using United States Navy canine/handler teams trained at Lackland Air Force Base in San Antonio, Tex. Six out of six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 4

Method of Making an Energetically-Inert Pseudoscent for Dynamite Explosive #2

Using GC analytical techniques, the headspace scent signature of dynamite explosive was determined to contain ethylene glycol dinitrate and nitroglycerine as its primary components. Since both components of the headspace signature were explosive materials, they cannot be used within the formation of an explosive scent simulant. So, nitroglycerin and ethylene glycol dinitrate were individually de-energized through the complete removal of their energetic nitro pendant groups and their substitution with "non-energetic but "odoriferously identical" acetate groups to form de-energized equivalents 54. A binary pseudoscent of type 55 was formulated by combining 5.02 g ethylene glycol diacetate (57.6% wrt glycerol monoacetate) and 2.41 g glycerol monoacetate (32.4% wrt ethylene glycol diacetate) in 10 g of rice husks to produce a 17.43 g training aid with a headspace scent signature of 67 ppm ethylene glycol diacetate and 2 ppm glycerol monoacetate within the box in which it was placed. The explosive scent simulant was subjected to scent validation tests, using the scent validation grid previously described. During the test, five out of five canines used in this study successfully detected this scent with behavioral cues normally associated with finding an explosive material.

After the scent validation process, the simulant was subjected to canine explosive detection tests, using United States Navy canine/handler teams trained at Lackland Air Force Base in San Antonio, Tex. Six out of six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 5

Method of Making an Energetically-Inert Pseudoscent for Dynamite Explosive #3

Referring to the energetic components available within the headspace scent signature of dynamite and the variety of de-energized equivalents that can be derived from them (54), a pseudoscent was formulated by combining 0.23 g ethylene glycol diacetate (4% wrt glycerol triacetate) and 5.56 g glycerol triacetate (96% wrt ethylene glycol diacetate) in 10 g of rice husks to produce a 15.8 g training aid that produces a headspace scent signature of approximately 6 ppm ethylene glycol diacetate and 3 ppm glycerol triacetate within the 1 ft$^3$ box within it was placed. The explosive scent simulant was subjected to scent validation tests, using the scent validation grid previously described, During the test, five out of five canines used in this study successfully detected this scent with behavioral cues normally associated with finding an explosive material.

After the scent validation process, the simulant was subjected to canine explosive detection tests, using United States Navy canine/handler teams trained at Lackland Air Force Base in San Antonio, Tex. Six out of six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 6

Method of Making an Energetically-Inert Pseudoscent for RDX Explosive #1

Referring to FIG. 1, using GC analytical methods, the headspace scent signature of military-grade C4 explosive was determined to contain, amongst other components, cyclohexanone, ethyl acetate, 2,3-Dimethyl-2,3-dinitrobutane (DM-DNB), 2-ethyl-hexan-1-ol, carene and 1 methylbutanoate. Since none of these components are energetic materials, they can all be used, either individually or in combinations, within a pseudoscent formulation. Accordingly, from the variety of non-energetic component combinations available, a binary-component pseudoscent containing 0.41 g of cyclohexanone (8% weight wrt 2-ethyl-1-hexanol) and 4.6 g of 2-ethyl-1-hexanol (92% weight wrt cyclohexanone) in 10 g of diatomaceous earth was formulated to yield a 15 g weight RDX training aid with an approximate headspace scent signature of 522 ppm cyclohexanone and 424 ppm of 2-ethyl-1-hexanol within the box in which it was placed. The explosive scent simulant was subjected to scent validation tests, using the scent validation grid previously described, During the test, five out of five canines used in this study successfully detected this scent with behavioral cues normally associated with finding an explosive material.

After the scent validation process the simulant was subjected to canine explosive detection tests, using United States Navy canine/handler teams trained at Lackland Air Force Base in San Antonio, Tex. Six out of Six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 7

Method of Making an Energetically-Inert Pseudoscent for RDX Explosive #2

From the components within the headspace scent signature of RDX, as identified in example 6, and variety of non-energetic component combinations available for the preparation of a scent simulant for this explosive, a single-component pseudoscent containing 1.1 g 2,3-dimethyldinitrobutane (100%, active ingredients) in 10 g of rice husks was formulated to yield a 11.1 g RDX training aid that produced a headspace scent signature of approximately 132 ppm within the box.

The simulant was subjected to canine explosive detection tests, using the search and detect method and the scent validation grid previously described. During the test, four out of five canines used in this study successfully detected this scent with behavioral cues normally associated with finding an explosive material. After the scent validation process the simulant was subjected to canine explosive detection tests, using United States Navy canine/handler teams trained at Lackland Air Force Base in San Antonio, Tex. Six out of Six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 8

Method of Making an Energetically-Inert Pseudoscent for RDX Explosive #3

From the components within the headspace scent signature of RDX, as identified in example 6, and variety of non-energetic component combinations available for the preparation of a scent simulant, a ternary-component training aid containing 0.7 g of cyclohexanone (8.3% weight wrt active ingredients), 0.7 g 2-ethyl-1-hexanol (8.3% weight wrt active ingredients) and 7.0 g 2,3-dimethyldinitrobutane (83.3% weight wrt active ingredients) in 10 g of rice husks was formulated to yield a 18.4 g RDX training aid. This headspace scent signature can be further adjusted by varying the ratio of these three components.

The explosive scent simulant was subjected to scent validation tests, using the scent validation grid as described above. During the test, five out of five canines used in this study successfully detected this scent with behavioral cues normally associated with finding an explosive material. After the scent validation process the simulant was subjected to canine explosive detection tests, using United States Navy canine/handler teams trained at Lackland Air Force Base in San Antonio, Tex. Six out of Six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 9

Method of Making an Energetically-Inert Pseudoscent for TNT Explosive #1

Referring to FIG. 1, using GC for headspace characterization, the headspace scent signature of military-grade TNT explosive was found to contain: (a) 2,4-DNT, (b) 2,3-DNT and (c) TNT, as the primary headspace components. Since TNT is classified as an explosive, our intent does not allow its use in the formation of an inert scent simulant. Therefore in order to fabricate odoriferous electronic equivalents (54) of TNT, the energetic functional groups within the molecular structure of TNT can be substituted with non-energetic ones that are similar in electronic properties. From the variety of possible substitutions possible with the use of electron withdrawing groups, TNT was "de-energized" by the complete removal of one nitro group (i.e., replacement of the nitro group with a hydrogen atom) and the replacement of a second nitro group with a chlorine atom. The resulting structure equates to the compound, 2-chloro-4-nitrotoluene. A single-component training aid was formulated by combining 2.29 g 2-chloro-4-nitrotoluene (100%, active material) and 10 g of diatomaceous earth to produce a 12.29 g training aid with a headspace scent signature of 1 ppm 2-chloro-4-nitrotoluene within the box.

Using a search and detect technique, the simulant was placed within the scent validation grid where four out of four canines used in this study successfully detected this scent by showing behavioral cues normally associated with finding an explosive material. After the scent validation process the simulant was subjected to canine explosive detection tests, using United States Navy canine/handler teams trained at Lackland Air Force Base in San Antonio, Tex. Six out of Six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

EXAMPLE 10

Method of Making an Energetically-Inert Pseudoscent for TNT Explosive #2

From the components within the headspace scent signature of TNT, as identified in example 9, TNT was "de-energized" through the following successive steps: (i) the removal of all the energetic nitro groups within the molecular structure of TNT, to form toluene, (ii) the conversion of the benzene residue in toluene's molecular structure to the straight-chained structure of 2-hexene, and (iii) the addition of one non-energetic functional group that has comparable electron-withdrawing properties to the nitro groups, to compensate for the three nitro groups previously removed. In this case, the introduced group was the aldehyde group, making the nomenclature of resulting de-energized equivalent of TNT trans-2-hexenal.

For the fabrication of a second de-energized component to put within the pseudoscent formulation, TNT was again de-energized by removing two nitro groups and a methyl group from the molecular structure of TNT, to form nitrobenzene. For pseudoscent formation, 0.04 g "aquasorb," a crosslinked superabsorbent polyacrylamide was added to a stirring mixture of 0.087 g trans-2-hexenal (2.33% wrt nitrobenzene), 3.64 g of nitrobenzene (97.67% wrt trans-2-hexenal) and 2 g of pure water. Stirring was continued until gelling commenced after which the whole was left standing to form a de-energized pseudoscent with a headspace scent signature of 382 ppm of trans-2-hexenal and 192 ppm of nitrobenzene.

The pseudoscent was subjected to scent validation tests using the search and detect method and the scent validation grid as described above. Four out of five canines used in this study successfully detected this scent by showing behavioral cues normally associated with finding an explosive material. After the scent validation process the simulant was subjected to canine explosive detection tests, using United States Navy canine/handler teams trained at Lackland Air Force Base in San Antonio, Tex. Six out of Six canines used in this study successfully detected this scent by showing behavioral cues normally associated with finding an explosive material, which was sitting down next to the box in a fashion EDDs are taught to indicate when they liken a scent to that of an explosive scent that they had been trained to detect. Note that none of the components used in this formulation is classified by DOT as an explosive.

The examples and embodiments described herein are for illustrative purposes only and various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

The invention claimed is:

1. A method for producing an energetically-inert pseudoscent of an explosive, comprising:
   a. identifying one or more energetic components within a headspace scent signature of the explosive;
   b. de-energizing the one or more energetic components identified within the headspace scent signature by replacing the one or more energetic components with non-energetic components that have similar electronic properties, but are non-energetic in character, to produce de-energized equivalents of the one or more energetic components; and
   c. combining the de-energized equivalents of the one or more energetic components into a first formulation, which is an energetically-inert pseudoscent substantially free of the explosive.

2. The method of claim 1, further comprising combining non-energetic components with the first formulation to form a composite second formulation.

3. The method of claim 1, wherein de-energizing the one or more energetic components comprises selecting an energetic compound from the headspace signature of the explosive.

4. The method of claim 3, wherein the de-energizing the one or more energetic components comprises successively replacing energetic functional groups within the molecular structure of the energetic compound that are electron-withdrawing in character, with functional groups that have similar electron withdrawing properties but are non-energetic in character, until the energetic compound loses its explosive properties.

5. The method of claim 3, wherein the de-energizing the one or more energetic components comprises successively replacing energetic functional groups within the molecular structure of the energetic compound that are electron-donating in character, with functional groups that have similar electron-donating properties but are non-energetic in character, until the energetic compound loses its explosive properties.

6. The method of claim 4, wherein the electron-withdrawing, energetic functional group within the molecular structure of the energetic compound is a nitro group.

7. The method of claim 5, wherein the electron-donating energetic functional group within the molecular structure of the energetic compound is an azide group.

8. The method of claim 4, wherein the non-electron-withdrawing replacement functional group is selected from the group consisting of cyano, acetyl, halogen, aldehyde functional groups, and mixtures thereof.

9. The method of claim 3, wherein the de-energizing the energetic compound comprises replacing the molecular structural backbone of the energetic compound with a structural homologue that has similar electronic properties.

10. The method of claim 9, wherein the structural backbone of the energetic compound is an aromatic residue.

11. The method of claim 10, wherein the aromatic backbone comprises between 4 and 30 carbon units.

12. The method of claim 10, wherein the structural backbone of the energetic compound is an aliphatic residue.

13. The method of claim 12, wherein the aliphatic backbone comprises between 1 and 30 carbon units.

14. The method of claim 10, wherein the structural backbone of the energetic compound is a closed ring compound.

15. The method of claim 14, wherein the closed ring compound comprises between 3 and 30 carbon units.

16. The method of claim 10, wherein the structural backbone of the energetic compound is an organometallic residue.

17. The method of claim 16, wherein the organometallic backbone comprises between 1 and 30 carbon units.

18. The method of claim 1, wherein the explosive is selected from the group consisting of water gel explosive, smokeless powder, tagged composition C and its variations, untagged composition C and its variations, composition B and its variations, time blasting fuse, detonating cord, trinitrotoluene (TNT), dynamite, emulsion basting agent, inorganic nitrates, pentolite, composition A and its variations, cyclotol, octahydro-1,3,5,7-tetranitro 1,3,5,7-tetrazocine (HMX), semtex, pentaeritol tetranitrate (PETN), nitrocellulose, tetryl, cyclotrimethylenetrinitramine (RDX), black powder, entropy-burst energetic materials, energetic salts, peroxides, hydrazines, and hydroxylamines.

19. A method for producing an energetically-inert pseudoscent of an explosive, comprising:
   a. identifying one or more energetic components within a headspace scent signature of the explosive;
   b. de-energizing the one or more energetic components identified within the headspace scent signature to produce de-energized equivalents of the one or more energetic components, wherein the de-energized equivalents are selected from the group consisting of ethylene glycol carboxaldehyde, ethylene glycol acetate, ethylene glycol chloride, glycerol acetate, glycerol carboxaldehyde, glycerol chlorides, ethyl fonnate, 1,3-dichloropropene and mixtures thereof; and
   c. combining the de-energized equivalents of the one or more energetic components into a formulation, which is an energetically-inert pseudoscent substantially free of the explosive.

20. The method of claim 2, wherein the non-energetic components are selected from the group consisting of cyclohexanone, ethyl acetate, 2,3-dimethyl-2,3-dinitrobutane, 2-ethyl-hexan-1-ol, carene, 1-methylbutanoate, decane, xylene, styrene, water, 2-ethyl-1-hexanol, methoxybendaldehyde, 2-chloro-4-nitrotoluene, trans-2-hexanol, limonene, toluene, acetone and mixtures thereof.

21. The method of claim 2, further comprising dissolving the first formulation, or the composite second formulation, in a solvent, adding an inert matrix, and removing the solvent.

22. The method of claim 3, wherein the energetic compound is selected from the group consisting of nitromethane, 5-nitro triazol-3-one (NTO), trinitrotoluene (TNT), picric acid, trinitro triamino benzene (TATB), 3,5-dinitro-2,6-bis-picrylamino pyridine (PYX), nitroglycerine (NG), ethylene glycol dinitrate (EGDN), diethylene glycol dinitrate (DEGDN), trimethylol ethyl trinitrate (TMETN), methylamine nitrate, and triacetone triphoaphate (TATP).

23. The method of claim 2, further comprising compounding the first formulation, or the composite second formulation, with a chemically inert polymeric binder or dispersant with a molecular weight of >320 atomic mass units (a.m.u.).

24. The method of claim 2, further comprising absorbing the first formulation, or the composite second formulation, into a chemically inert porous supporting matrix material.

25. The method of claim 2, further comprising absorbing the first formulation, or the composite second formulation, onto grain husks, cellulose and natural fibers.

26. The method of claim 2, further comprising mixing the first formulation, or the composite second formulation, with a gelling agent to form a gel.

27. The method of claim 2, further comprising mixing the first formulation, or the composite second formulation, to form an emulsion.

28. A method for producing an energetically-inert pseudoscent of an explosive, comprising:
   a. identifying one or more non-energetic components within a headspace scent signature of the explosive;
   b. selecting the identified one or more non-energetic components for combining into a formulation;
   c. combining the selected one or more non-energetic components of the headspace scent signature into a first formulation, which is an energetically-inert pseudoscent is substantially free of the explosive; and
   d. combining de-energized components of the headspace scent signature with the first formulation to form a composite second formulation, wherein the de-energized components are selected from the group consisting of ethylene glycol carboxaldehyde, ethylene glycol acetate, ethylene glycol chloride, glycerol acetate, glycerol carboxaldehyde, glycerol chlorides, ethyl formate, 1,3-dichloropropene and mixtures thereof.

29. The method of claim 28, wherein the explosive is selected from the group consisting of water gel explosive, smokeless powder, tagged composition C and its variations, untagged composition C and its variations, composition B and its variations, time blasting fuse, detonating cord, trinitrotoluene (TNT), dynamite; emulsion basting agent, inorganic nitrates, pentolite, composition A and its variations, cyclotol, octahydro 1,3,5,7-tetranitro-1,3,5,7-tetrazocine (HMX), semtex, pentaeritol tetranitrate (PETN), nitrocellulose, tetryl, cyclotrimethylenetrinitramine (RDX), black powder, entropy-burst energetic materials, energetic salts, and reactive chemicals such as peroxides, hydrazines, and hydroxylamines.

30. The method of claim 28, wherein the one or more non-energetic components are selected from the group consisting of cyclohexanone, ethyl acetate, 2,3-dimethyl-2,3-dinitrobutane, 2-ethyl-hexan-1-ol, carene, 1-methylbutanoate, xylene, styrene, 2-ethyl-1-hexanol, water, decane, limonene, toluene, acetone, methoxybendaldehyde, 2-chloro-4-nitrotoluene, trans-2-hexenal, 2-butanone and mixtures thereof.

31. The method of claim 28, further comprising dissolving the first formulation or the composite second formulation in a solvent, adding an inert matrix, and removing the solvent.

32. The method of claim 28, further comprising compounding the first formulation or the composite second formulation with a chemically inert polymeric binder or dispersant with a molecular weight of >320 atomic mass units (a.m.u.).

33. The method of claim 28, further comprising absorbing the first formulation or the composite second formulation into a chemically inert porous supporting matrix material.

34. The method of claim 28, further comprising absorbing the first formulation or the composite second formulation onto grain husks, cellulose and natural fibers.

35. The method of claim 28, further comprising mixing the first formulation or the composite second formulation with a gelling agent to form a gel.

36. The method of claim 28, further comprising mixing the first formulation or the composite second formulation to form an emulsion.

37. A method of evaluating an energetically-inert pseudoscent of an explosive, comprising:
   producing an energetically-inert pseudoscent of an explosive by the method according to claim 1; and
   exposing an effective amount of the first formulation to a creature that is certified in an explosives detection program that uses real explosives in its training process.

38. The method of claim 37, wherein the creature belongs to the mammal family.

39. The method of claim 37, wherein the creature belongs to the insect family.

40. The method of claim 37, wherein the creature belongs to the aves family.

41. A method of evaluating the energetically-inert pseudoscent of an explosive, comprising:
   producing an energetically-inert pseudoscent of an explosive by the method according to claim 19; and
   exposing an effective amount of the formulation to a creature that is certified in an explosives detection program that uses real explosives in its training process.

42. The method of claim 41, wherein the creature belongs to the mammal family.

43. The method of claim 41, wherein the creature belongs to the insect family.

44. The method of claim 41, wherein the creature belongs to the aves family.

* * * * *